E. R. BURKEY & J. F. VOELPEL.
COTTON CHOPPER.
APPLICATION FILED FEB. 21, 1914.

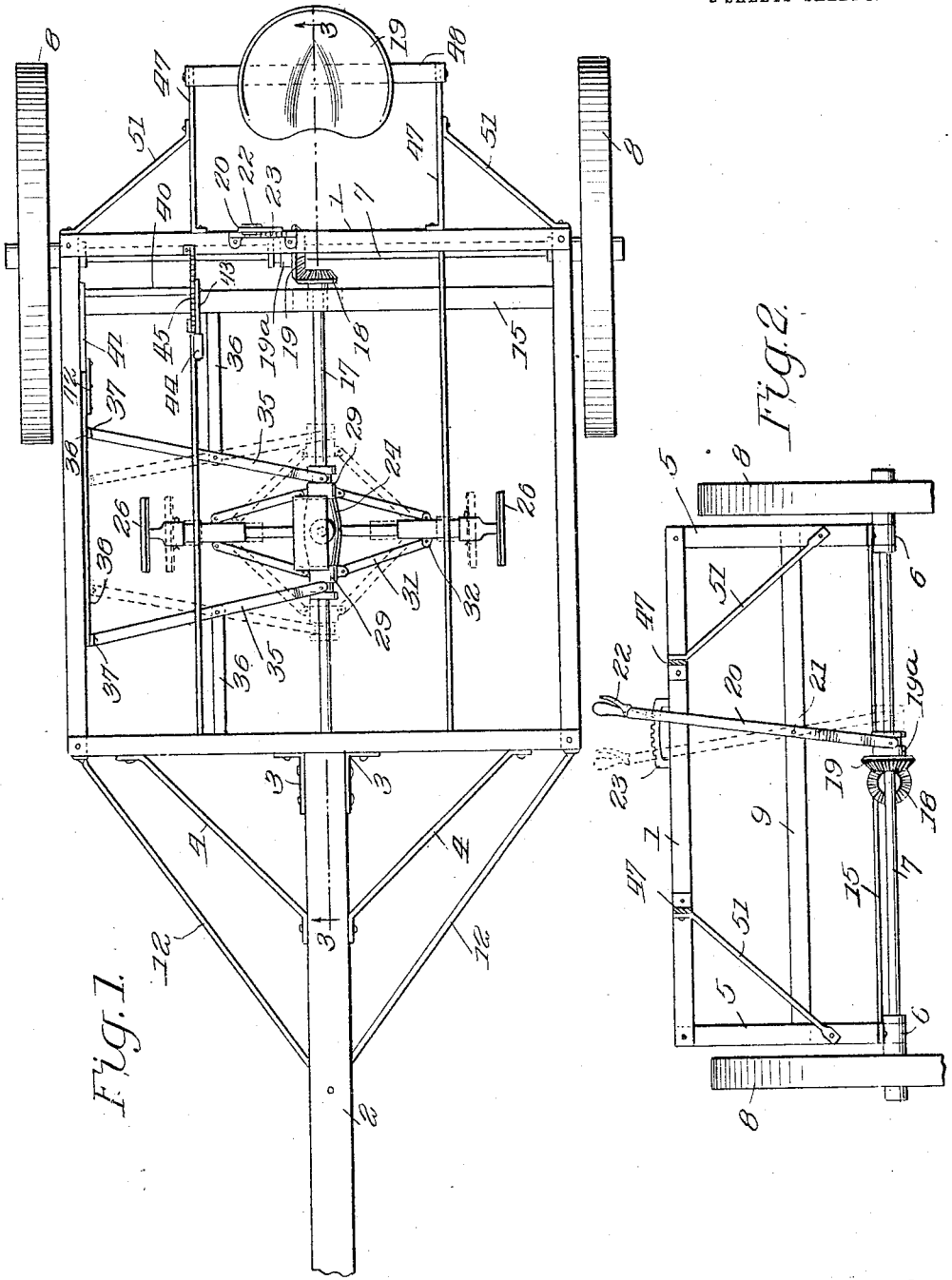

1,121,974.

Patented Dec. 22, 1914.
2 SHEETS—SHEET 2.

WITNESSES

INVENTORS
ELMER R. BURKEY
JOHN F. VOELPEL
BY
ATTORNEYS

UNITED STATES PATENT OFFICE.

ELMER R. BURKEY AND JOHN F. VOELPEL, OF VERONA, MISSOURI.

COTTON-CHOPPER.

1,121,974.

Specification of Letters Patent.

Patented Dec. 22, 1914.

Application filed February 21, 1914. Serial No. 820,173.

*To all whom it may concern:*

Be it known that we, ELMER R. BURKEY and JOHN F. VOELPEL, citizens of the United States, and residents of Verona, in the county of Lawrence and State of Missouri, have invented a new and useful Improvement in Cotton-Choppers, of which the following is a specification.

Our invention is an improvement in cotton choppers, and has for its object to provide a device of the character specified, wherein a wheel supported frame is provided adapted to be drawn through the field with the wheels astride the row of growing plants, and wherein other mechanism is provided in connection with the frame and supported thereby and moving transversely of the row for cutting out the excess plants, the said mechanism being arranged to cut deep or shallow and being controlled by the operator of the machine.

Figure 3:
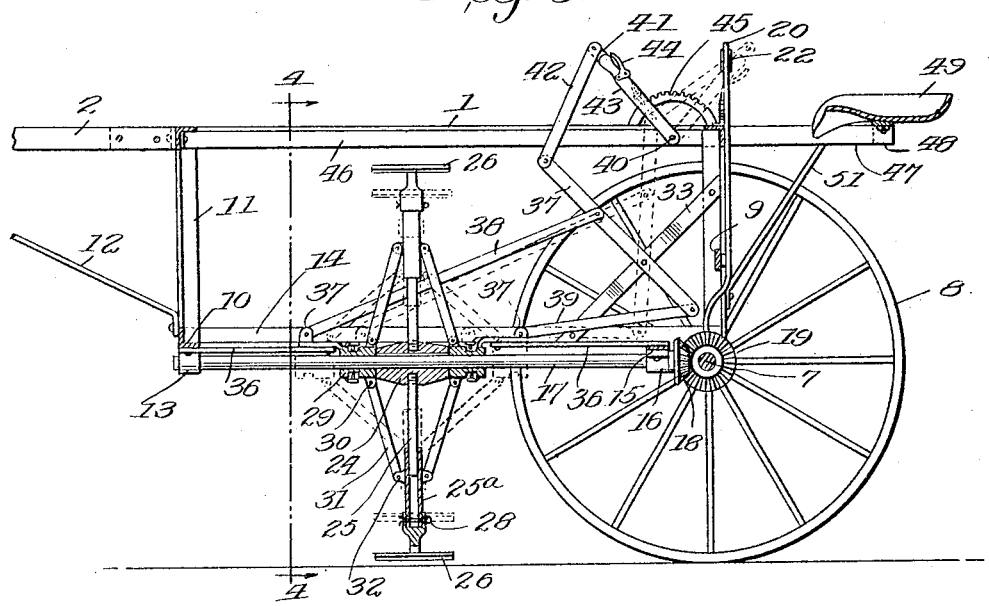
Figure 4:
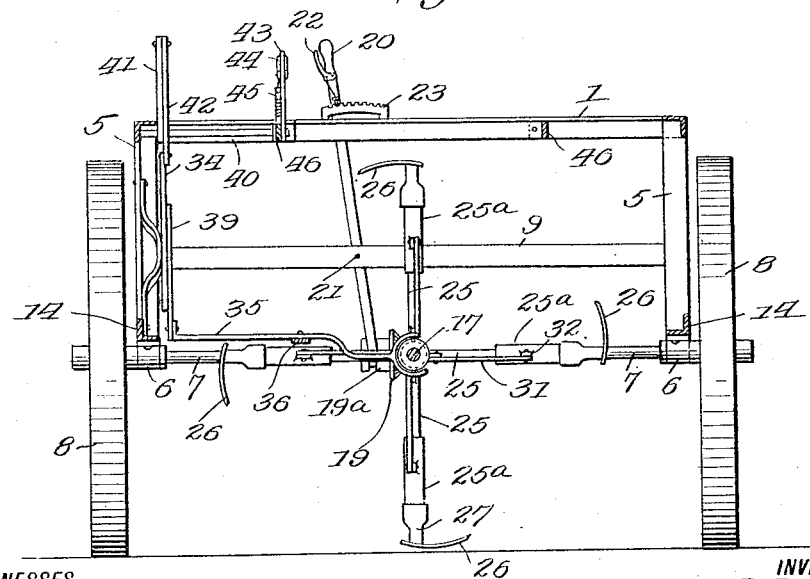

In the drawings:—Figure 1 is a top plan view of the improved cotton chopper, Fig. 2 is a partial rear view with the chopping mechanism omitted for the sake of clearness, Fig. 3 is a section on the line 3—3 of Fig. 1, looking in the direction of the arrows, and Fig. 4 is a section on the line 4—4 of Fig. 3, looking in the direction of the arrows.

The present embodiment of the invention comprises an upper substantially rectangular frame 1, to one end of which is connected a tongue 2, by means of angle brackets 3, and inclined braces 4 are arranged between the tongue and the front of the frame at each side of the tongue. Standards 5 depend from the rear end of the frame at each side thereof and each standard is provided at its lower end with a bearing 6, the bearings being in alinement, and an axle 7 is journaled in the bearings. Wheels 8 are secured to the ends of the axle, and the standards 5 are connected by a cross bar 9 intermediate their ends. A cross bar 10 is arranged directly below the front end of the upper frame 1, and the ends of the cross bar are connected to the front of the frame by means of depending standards 11. Inclined braces 12 are arranged between the lower ends of the standards and the tongue, and a bearing 13 is provided at the center of the cross bar. Longitudinal bars 14 connect the front cross bar 10 with the rear standards 5, the said bars 14 being at each side of the frame, and the said bars 14 are connected near their rear ends by means of a cross plate 15, which is provided at its center with a bearing 16, the said bearing being in alinement with the bearing 13 on the front cross bar. The upper frame, the standards 5 and 11, and the cross bar 10 are of angle material as shown, while the cross bar 9 and the cross plate 15 are of flat material. A shaft 17 is journaled in the bearings 13 and 16, and a beveled gear wheel 18 is secured to the rear end of the shaft, just behind the cross plate 15. The beveled gear wheel 18 meshes with a similar gear wheel 19, which is mounted to slide on the axle 7, and is feathered thereto to constrain the gear wheel to rotate with the axle. The gear wheel 19 is moved into and out of mesh with the gear wheel 18 by means of a lever 20, pivoted intermediate its ends to the cross bar 9 as indicated at 21, and the lower end of the lever is forked as shown, to engage opposite sides of the hub 19ª of the gear wheel 19, and the arms of the fork are provided with rollers which engage an annular groove in the hub. The lever is provided with latch mechanism 22, for coöperating with a toothed sector 23, secured to the upper frame for holding the lever in adjusted position. By means of the lever 20 the shaft 17 may be connected to the axle or may be disconnected therefrom to constrain the shaft 17 to rotate with the axle.

The chopping mechanism comprises a sleeve 24 keyed to the shaft 17, as shown in Fig. 3, and four radial arms are connected with the sleeve. Each of the arms is sectional and is expansible and contractible, and each arm comprises an inner section 25, having at its inner end a threaded engagement with the sleeve 24, and the outer end of each of the said sections is slidable within the tubular outer section 25ª. A hoe blade 26 is supported by each arm, each hoe blade being of suitable length and being concavo-convex transversely, and arranged with its convex face outwardly. The sectional arms 25—25ª are arranged at angular distances of 90 degrees from each other, and the blade 26 is connected to the outer section of the arm by means of a socket 27, extending approximately perpendicular from the concave face of the blade near one side edge thereof, the outer end of the outer section of the arm being received within the socket and connected thereto by means of a cotter pin 28. The cotter pin 28 passes through the socket and the outer end of the section 25ª, and the ends thereof are bent apart as shown in Fig. 3.

An annularly grooved collar 29 is arranged on the shaft 17 at each end of the sleeve 24, and each collar is provided with four radial lugs 30, the lugs being spaced at angles of 90 degrees with respect to each other. A link 31 connects each lug with a lug 32, on the adjacent side of the outer section of the adjacent arm. The arrangement is such that both sleeves 29 are connected with each arm, the links 31 of each arm extending from opposite sides thereof to their connection with the adjacent collars. It will be evident that when the collars 29 are moved away from the sleeve 24, the outer sections of the arms will be moved toward the shaft 17, while when the collars 29 are moved toward the sleeve, the outer sections of the arms will be moved radially away from the shaft.

An inclined brace 33 is arranged between one of the standards 9 and the adjacent bar 14, and a lever 34 is pivoted intermediate its ends to the said brace. Each collar 29 is provided with an annular groove, which is engaged by pins or rollers on the arms of a fork at one end of a lever 35. Each lever 35 is pivotally mounted intermediate its ends on a supporting arm 36. The front supporting arm extends rearwardly from the cross bar 10, and the rear supporting arm extends forwardly from the cross plate 15. The outer end of each lever 35 is provided with an upstanding lug 37, and links 38 and 39 connect the lugs 37 with the lever 34. The link 38 has one end connected with the lever 34 above its pivotal connection and has the other end connected with the lever 35 remote from the lever 34. The link 39 has one end connected with the lever 34 below its pivotal connection and the other end of the link is connected to the lever 35 adjacent to the lever 34.

A stub shaft 40 is journaled on the frame 1 at the rear thereof, and the outer end of the shaft is provided with a radially extending arm 41, which is connected to the upper end of the lever 34, by means of a link 42. At its other end, the shaft is provided with a radially extending handle or lever 43, and the lever or handle is provided with latch mechanism 44, which coöperates with a toothed sector 45, secured to the adjacent member of a pair of longitudinally extending braces 46, the said braces extending between the front and rear members of the upper frame. When the lever or handle 44 is released from the sector 45, it may be swung to oscillate the shaft 40 in a direction to move the lever 34, and when the said lever 34 is moved, the collars 29 will be moved toward and from the sleeve 24, the direction of their movement depending upon the direction of movement of the lever 34. Arms 47 extend rearwardly from the upper frame 1, on each side of the center thereof, and the said arms are connected by a seat supporting plate 48. A seat 49 is secured to the center of the plate, and inclined braces are arranged between the arms and the adjacent end of the frame 1. Other inclined braces 51 are arranged between the arms 47, and the rear standards 5. The seat is thus supported in rear of the axle, so that the weight of the driver acts as a counterbalance to the weight of the frame.

The operation of the chopper is as follows:—The machine is drawn through the field with the wheels 8 astride the row. With the parts in the full line position of Figs. 1 and 3, it will be evident that for every complete rotation of the shaft 17, the cutting blades or hoes 26 will engage the ground four times, each hoe making one cut. The blades or hoes may be adjusted in accordance with the depth at which it is desired to cut by means of the lever or handle 43, and when adjusted the hoes may be held at the proper radial distance with respect to the shaft. When on the road or when turning, the lever 20 is operated to release the shaft 17 from the axle.

It is obvious that a greater or less number of hoes might be used if desired or found advisable, but with four hoes and the proper gear ratio between the axle and the shaft, it will be found that four hoes are preferable. Obviously the faster the shaft 17 rotates, the greater the number of plants chopped out.

The device is simple in construction and operation. The form of the frame members provides a very strong rigid frame, and the frame may be braced in any desired manner.

We claim:—

1. A cotton chopper comprising a wheel supported frame provided at its front end with draft apparatus, a shaft journaled longitudinally of the frame at the center thereof, and having a driving connection with the wheels, and chopping mechanism supported by the shaft, said mechanism comprising a sleeve secured to the shaft, arms extending radially from the sleeve in spaced relation, each arm comprising an inner section secured to the sleeve and an outer section slidable on the inner section toward and from the sleeve, a hoe detachably connected with the outer section of each arm, and means for simultaneously moving the outer sections of the arms toward and from the shaft, said means comprising a collar on the shaft at each end of the sleeve and movable toward and from the sleeve, a link connecting each collar with the outer section of each arm, said links being pivoted to the collars and to the arms, and means for simultaneously moving the collars toward and from the sleeve, said means comprising a lever for each collar and connected at one end to the collar, each lever being pivoted to the frame intermediate its ends, a lever pivoted to the frame intermediate its ends, a link connecting each end of the last-named lever to one of the first-named levers, and means for swinging the last-named lever.

2. A cotton chopper comprising a wheel supported frame provided at its front end with draft apparatus, a shaft journaled longitudinally of the frame at the center thereof, and having a driving connection with the wheels, and chopping mechanism supported by the shaft, said mechanism comprising a sleeve secured to the shaft, arms extending radially from the sleeve in spaced relation, each arm comprising an inner section secured to the sleeve and an outer section slidable on the inner section toward and from the sleeve, a hoe connected with the outer section of each arm, and means for simultaneously moving the outer sections of the arms toward and from the shaft, said means comprising a collar on the shaft at each end of the sleeve and movable toward and from the sleeve, a link connecting each collar with the outer section of each arm, said links being pivoted to the collars and to the arms, and means for simultaneously moving the collars toward and from the sleeve.

3. A cotton chopper comprising a wheel supported frame provided at its front end with draft apparatus, a shaft journaled longitudinally of the frame at the center thereof, and having a releasable driving connection with the wheels, and chopping mechanism supported by the shaft, said mechanism comprising a sleeve secured to the shaft, arms extending radially from the sleeve in spaced relation, each arm comprising an inner section secured to the sleeve and an outer section slidable on to the inner section toward and from the sleeve, a hoe connected with the outer section of each arm, and means for simultaneously moving the outer sections of the arms toward and from the shaft.

4. A cotton chopper comprising a wheel supported frame, a shaft journaled longitudinally of the frame, a driving connection between the shaft and the wheels, and chopping mechanism in connection with the shaft, said mechanism comprising a sleeve secured to the shaft, a series of radial arms connected with the sleeve, each arm comprising an inner section secured to the sleeve and an outer section slidable with respect to the inner section, a chopping blade connected with the outer section of each arm, and means for simultaneously moving the outer sections toward or from the shaft, said means comprising a collar on the shaft at each end of the sleeve, a connection between each collar and the outer section of each arm, and means for simultaneously moving the collars in opposite directions.

5. A cotton chopper comprising a wheel supported frame, a shaft journaled longitudinally of the frame, and chopping mechanism in connection with the shaft, said mechanism comprising a sleeve secured to the shaft, a series of radial arms connected with the sleeve, each arm comprising an inner section secured to the sleeve and an outer section slidable with respect to the inner section, a chopping blade connected with the outer section of each arm, and means for simultaneously moving the outer sections toward or from the shaft.

ELMER R. BURKEY.
JOHN F. VOELPEL.

Witnesses:
ROBERT J. MITCHELL,
LENI L. MITCHELL.

Copies of this patent may be obtained for five cents each, by addressing the "Commissioner of Patents, Washington, D. C."